Sept. 21, 1965     R. L. LEWIS     3,207,328
TOBACCO HARVESTER
Filed Oct. 21, 1963     4 Sheets-Sheet 3
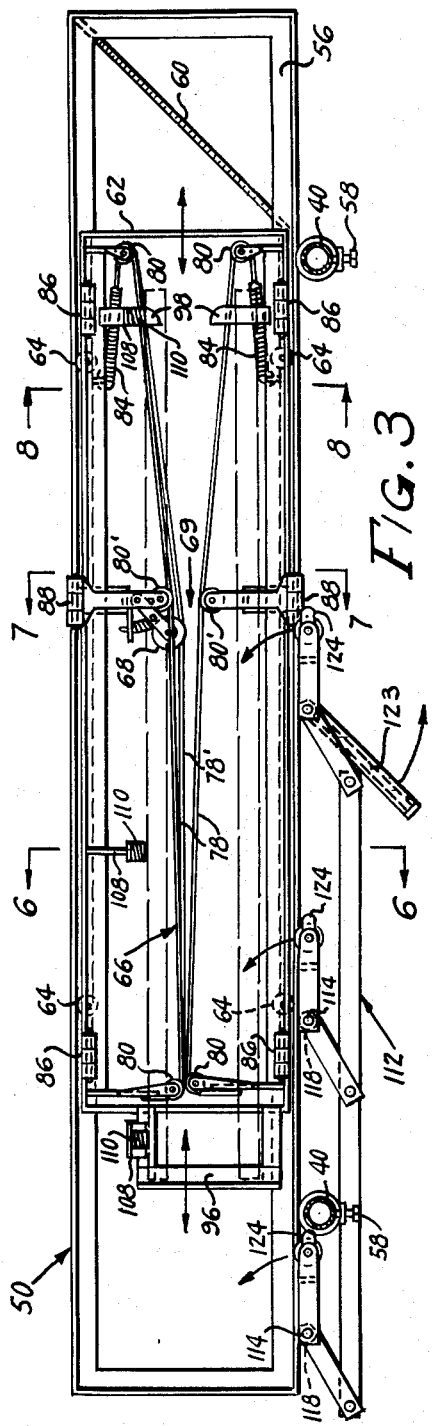
INVENTOR.
ROBERT L. LEWIS
BY
*Kimmel & Crowell*
ATTORNEYS.

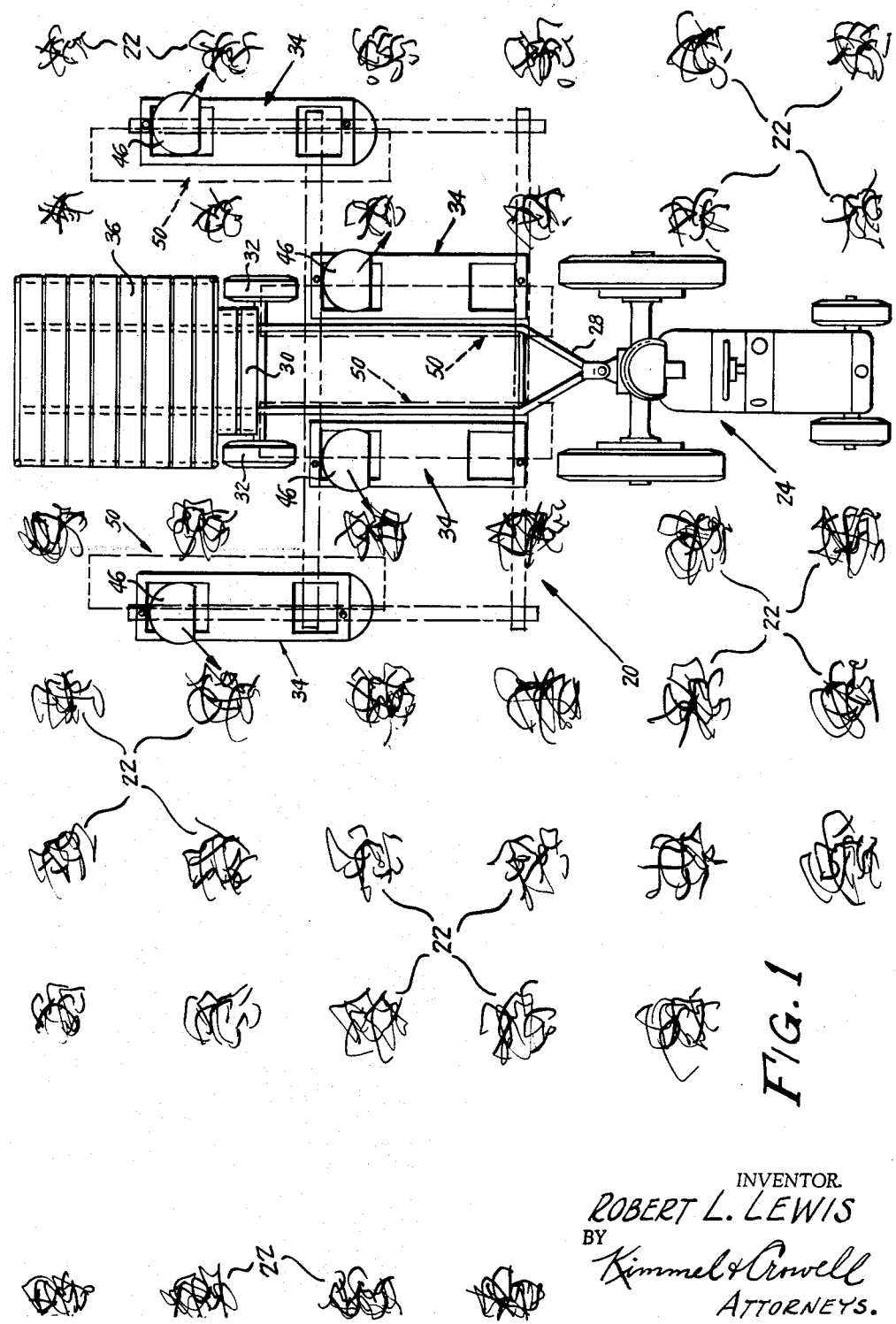

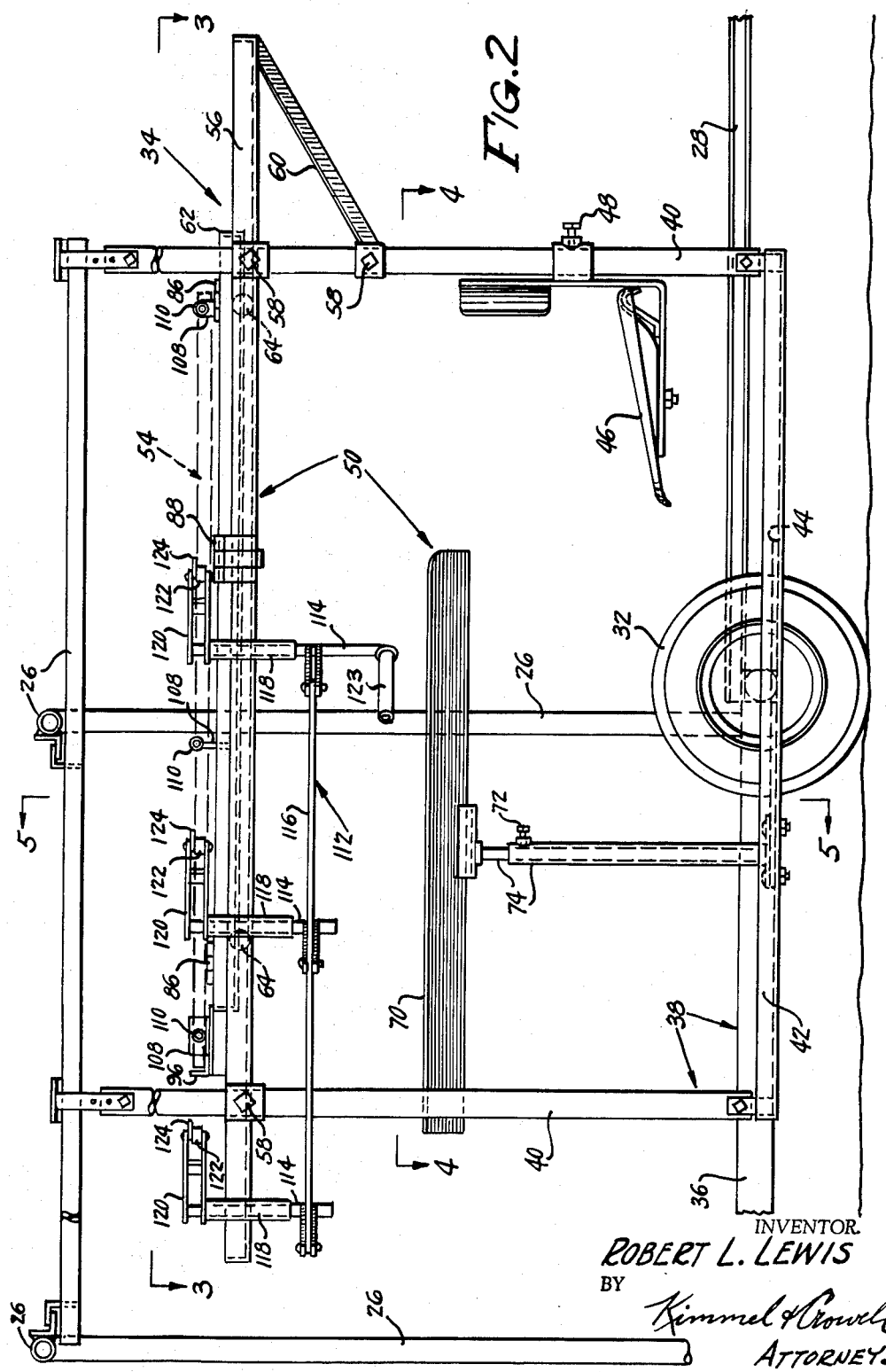

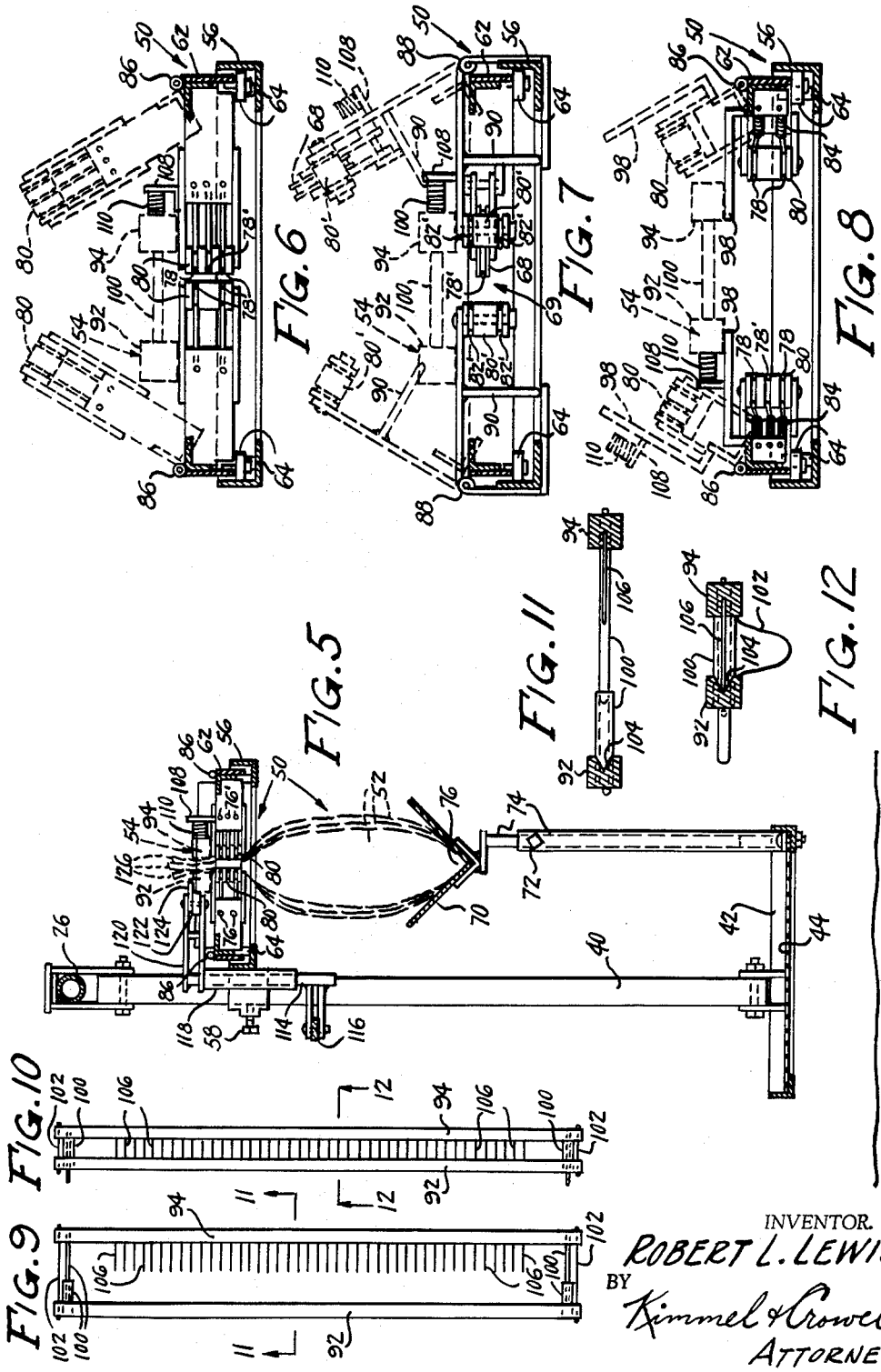

United States Patent Office 3,207,328
Patented Sept. 21, 1965

3,207,328
TOBACCO HARVESTER
Robert L. Lewis, P.O. Box 146, Baxley, Ga.
Filed Oct. 21, 1963, Ser. No. 317,723
12 Claims. (Cl. 214—5.5)

This invention relates to a tobacco harvester and relates more particularly to a machine for harvesting tobacco or the like which increases the harvesting output while decreasing the necessary labor force.

As conducive to a better understanding of the instant invention, it should be understood that tobacco is frequently harvested by means of a machine which is drawn by a propelling means, such as a tractor or the like, the propelling means operating in an unplanted row, with two rows of tobacco plants on either side thereof. The harvesting machine previously in use carries seats for four croppers, that is, one cropper for each row of tobacco, a small platform being interposed between the wheels of the machine on which a stick handler stands and performs his duty. As the machine moves down the unplanted row, the tobacco leaves are taken the stalk by the four croppers and are handed directly forward to a stringer seated in front of each cropper on the machine, and riding backward. The stringer takes the tobacco leaves and strings them on a stick which is positioned conveniently to him. When sufficient tobacco is strung on each stick, it is removed by the stick handler who places it on a pallet at the rear of the machine. It will be noted that this procedure requires a total of nine persons, four croppers, four stringers and a stick handler.

It is a primary object of the instant invention to automate a portion of the conventional tobacco harvesting procedure whereby the number of individuals necessary may be decreased from nine to five without deleteriously affecting the output, the efficiency of the machine being such that more tobacco may be harvested in a given period of time by the reduced labor force of five than was formerly harvested by the nine members of the harvesting team.

Another object of this invention is the provision of a harvesting machine which precludes the necessity of stringers, the croppers being able to feed the picked tobacco leaves directly into a tobacco supporting means which temporarily receives and holdingly engages the same until sufficient tobacco leave have been picked to warrant transfer therefrom by engaging a stick means with the picked tobacco leaves and disengaging the tobacco supporting means, the stick handler then removing the stick means for storage on the harvesting machine as was conventional heretofore.

Yet another object of this invention is to provide a machine of the character described wherein the picked tobacco leaves receive less physical handling and therefore the losses normally encountered from breakage, bruising, and scattering of tobacco leaves during harvesting is substantially reduced.

A further object of the instant invention is to provide a tobacco harvesting machine wherein the tobacco leaves need not be strung together thereby avoiding a time-consuming hand operation and facilitating later processing of the tobacco leaves.

Another object of this invention is to provide a harvesting machine having a tobacco supporting means for temporarily receiving and holdingly engaging tobacco leaves picked by a cropper, the tobacco supporting means including cable holding means having a nip portion which is fixed in stationary relationship with regard to the seat means on which the cropper is carried in order that he may always place the picked tobacco leaves in the same position regardless of the quantity of tobacco leaves already being carried by the tobacco supporting means.

A still further object of this invention is the provision of a machine of the type described in which the temporarily held tobacco leaves are automatically released on lifting of a closed stick means by the stick handler.

Other and further objects reside in the combination of elements, arrangement of parts and features of construction.

Still other objects will in part be obvious and in part be pointed out as the description of the invention proceeds and as shown in the accompanying drawings wherein:

FIGURE 1 is a top plan view of a tobacco harvesting machine in accordance with the instant inventive concept being propelled through a field of tobacco plants by a tractor or the like;

FIGURE 2 is a side elevational view of a single tobacco harvesting unit, a plurality of such units being secured to a main frame means to be propelled by the tractor or the like, if desired, with parts broken away for illustrative convenience;

FIGURE 3 is a top plan view of the tobacco supporting means taken substantially on line 3—3 of FIGURE 2;

FIGURE 4 is a cross-sectional view through the unit frame means taken substantially on line 4—4 of FIGURE 2;

FIGURE 5 is a vertical sectional view taken substantially on line 5—5 of FIGURE 2 and showing a plurality of tobacco leaves holdingly engaged by the tobacco supporting means in dotted lines;

FIGURE 6 is a transverse cross-sectional view through the tobacco supporting means taken substantially on line 6—6 of FIGURE 3 and showing stick means and the released position of the holding means in dotted lines;

FIGURE 7 is a view similar to FIGURE 6 taken substantially on line 7—7 of FIGURE 3;

FIGURE 8 is a view similar to FIGURES 6 and 7 taken substantially on line 8—8 of FIGURE 3;

FIGURE 9 is a top plan view to a reduced scale of a stick means in accordance with the instant invention in open position;

FIGURE 10 is a view similar to FIGURE 9 showing the stick means in closed position;

FIGURE 11 is a transverse sectional view through the stick means taken substantially on line 11—11 of FIGURE 9; and FIGURE 12 is a transverse sectional view through the closed stick means taken substantially on line 12—12 of FIGURE 10.

Like reference characters refer to like parts throughout the several views of the drawings.

Referring now to the drawings in general and more particularly to FIGURE 1, a tobacco harvesting machine in accordance with the instant inventive concept is designated generally by the reference numeral 20 and is shown as being moved through a field of tobacco plants 22 by a propelling means 24, such as a conventional tractor or the like. The tobacco harvesting machine 20 as illustrated in FIGURE 1 is comprised of a main frame means 26 shown in dotted lines having a forwardly extending tongue 28 removably securable to the propelling means 24, a centrally extending platform 30 supported on wheel means 32 and adapted to carry a stick handler whose job it is to lift loaded stick means (not shown in FIGURE 1) from each of a plurality of tobacco harvesting units generally indicated at 34 carried in any conventional manner by the main frame means 26 and laterally spaced with respect to the direction of travel of the propelling means 24 to permit harvesting of an equal plurality of rows of tobacco plants 22, the stick handler placing the loaded stick means on a rearwardly extending pallet 36 and replacing the same with an unloaded stick means to permit substantially continual harvesting of tobacco leaves from the plants 22. It is to be understood that the tobacco harvesting machine 20 may be self-propelled if desired and may carry one, or any convenient number, of tobacco harvesting units 34, the arrangement of the main frame means 26 being modified to accommodate the specific construction of the remainder of the machine 20. The main frame means 26 may be rendered collapsible in any conventional manner to facilitate transportation of the same when not in use and may be provided with an overhead awning means or the like (not shown) to protect the harvesting machine from sun or precipitation of any kind.

Each tobacco harvesting unit 34 is comprised basically of a unit frame means 38 secured to the main frame means 26 and including a plurality of vertically extending unit frame members 40 and a bottom frame element 42 carrying foot support means 44, a seat means 46 secured to one of the vertically extending unit frame members 40 at 48 in vertically adjustable relationship, a tobacco supporting means designated generally by the reference numeral 50 secured to the unit frame means 38 and temporarily receiving and holdingly engaging a plurality of tobacco leaves shown in dotted lines at 52 in FIGURE 5 in a manner to be more fully described hereinafter, the tobacco supporting means 50 removably carrying a stick means 54 which is movable to holdingly engage the picked tobacco leaves 52 when sufficient of the same are carried by the tobacco supporting means 50 to warrant transfer from the tobacco harvesting unit 34 to the pallet 36 by the stick handler.

The tobacco supporting means 50 is basically comprised of a substantially horizontally extending support element 56 carried by the vertically extending unit from members 40 in vertically adjustable relationship at 58, a brace means 60 being included if desired to strength the same, a tobacco supporting carriage 62 shorter than the support element 56 and carried thereon in longitudinally movable relationship by roller means 64, the carriage 62 having secured thereto for movement therewith a cable holding means 66 to be described in more detail hereinafter, a spring-pressed roller means 68 being secured to the support element 56 and cooperating with the cable holding means 66 to define a nip portion 69 maintained in a substantially stationary or fixed relationship with respect to the seat means 46 even when the carriage 62 is moved with respect to the support element 56, the tobacco supporting means 50 further including a trough means 70 supported in vertically adjustable relationship at 72 on telescoping means 74 secured to the bottom frame element 42, the function of the trough means 70 being to support the tip ends 76 of the tobacco leaves 52 as seen particularly in FIGURE 5.

The cable holding means 66 includes at least one longitudinally extending cable member 78 disposed on, and secured to, each side of the carriage 62 with guide roller means 80 rotatably supported in longitudinally spaced relationship on each side of the carriage 62, the guide roller means having portions defining groove means 82 guiding and carrying the cable members 78, two cable members 78 being shown on each side of the carriage 62 with an additional cable member 78' interposed on one side, the additional cable member 78' being normally biased by the spring-pressed roller means 68 towards the cable members 78 on the opposite side to define the nip portion 69. Spring means 84 are provided normally biasing each of the cable members 78 and 78' into taut engagement with the guide roller means 80 and with the spring-pressed roller means 68. The rotatable supports for the guide roller means 80 are pivotally secured at 86 to the carriage 62, and the rotatable supports for the spring-pressed roller means 68 and for an intermediate pair of guide roller means 80' having groove means 82' therein are pivotally secured at 88 to the support element 56 so as to maintain the nip portion 69 of the cable holding means 66 in a stationary relationship particularly with respect to the seat means 46 so that a cropper carried thereby may always feed picked tobacco leaves 52 into the same position regardless of the sliding relationship of the carriage 62 with respect to the support element 56 and therefore regardless of the quantity of picked tobacco leaves 52 already carried by the holding means 66 of the tobacco supporting means 50. Positioning elements 90 are secured to the members rotatably supporting intermediate guide roller means 80' to set these guide roller means in a substantially horizontally extending holding position wherein the cable members 78 and 78' are juxtaposed to temporarily support the picked tobacco leaves 52, the remainder of the guide roller means 80 being held in a similar position by the engagement of the cable members 78 and 78' therewith.

The stick means 54 includes two longitudinally extending stick members 92 and 94 carried by the tobacco supporting means 50 to which stick supporting extension 96 and stick supporting tabs 98 are secured. The stick supporting members 92 and 94 have cooperating telescoping means 100 to guide the movement of the members 92 and 94 between an open position shown particularly in FIGURES 9 and 11 and a closed position shown particularly in FIGURES 10 and 12. A plurality of longitudinally spaced string means 102 may be secured between the stick members 92 and 94 to limit the space therebetween when the stick means is moved to its open position. One of the stick members includes portions defining a longitudinally extending notch means 104 therein, the other of the stick members including a plurality of longitudinally spaced, transversely extending, nail means 106 having sharpened terminal portions directed toward the notch means 104, spaced therefrom when the stick means is in the open position, and in engagement therewith when the stick means is in the closed position.

A plurality of longitudinally spaced stop means are secured to the top of the tobacco supporting means 50 with spring means 110 in abutting relationship with the side of one of the stick members. A pushing means 112 includes a plurality of vertically extending pivot bars 114 operative innerconnected by a horizontally extending link member 116, the pivot members 114 passing through sleeves 118 secured to the support element 56 and carrying at their upper end horizontally extending pushing members 120 with rotatably supported roller means 122 juxtaposed to the stick member opposite the stop means 108, a handle means 123 being provided for selectively actuating the pushing means 112 to engage the roller means 122 with the stick member and to thereby push that stick member toward the other stick member moving the stick means 54 from its open to its closed position, the spring means 110 accommodating slight variations in dimensions of the stick means 54. The pusher members 120 carry horizontally extending tab means 124 engaging over the one stick member when the pushing means 112 is selectively actuated thereby limiting upward movement of the one stick member and precluding accidental buckling of the stick means 54 during movement of the same from its open to its closed position. The pushing means 112 is readily disengaged by rotation of the handle means 123 in an opposite direction after the stick means 54 has been moved to its closed position.

The use and operation of the device of the instant invention will now be apparent. The tobacco harvesting machine 20 is moved along the tobacco field by a propelling means such as a tractor 24 with each tobacco harvesting unit 34 being suspended from the main frame means 26 adjacent one of the rows of tobacco plants 22, the seat means 46 of each unit 34 carrying a cropper in juxtaposition to the row of tobacco plants 22 whereby he may substantially continuously pick tobacco leaves 52 therefrom. The cropper places each handful of tobacco leaves in the tobacco supporting means 50, the stem ends 126 thereof being continuously fed into the nip portion 69 of the cable holding means 66, this nip portion 69 remaining stationary relative to the cropper since the elements forming the same are secured to the stationary support element 56. The cable supporting means 66 is in its substantially horizontally extending holding position as shown in full lines in FIGURES 6 to 8 and carries a stick means 54 with the stick members 92 and 94 being in the open position shown in FIGURES 9 and 11 and shown in dotted lines in FIGURES 3 and 6 to 8. Portions of the stem ends 126 of the picked tobacco leaves 52 extend upwardly from the cable holding means 66 into the space between the stick members 92 and 94 and the tip ends 76 thereof are supported in the trough means 70 as seen in FIGURE 5. As the cropper continues to feed picked tobacco leaves 52 into the nip portion 69 of the cable holding means 66, the tobacco supporting carriage 62 is moved, by the increasing bulk of successive leaves, longitudinally of the support element 56, the cable holding means 66 temporarily holdingly engaging the picked tobacco leaves 52 and carrying the same away from the cropper toward the forward end of the support element 56. When sufficient tobacco leaves 52 are carried by the tobacco supporting means 50, that is, when the carriage 62 has moved substantially the entire distance along the support element 56 and the cable holding means 66 is relatively full, the cropper actuates the pushing means 112 by pulling the handle means 123 towards him in the direction of the arrow in FIGURE 3 thereby moving the stick means from their open position to their closed position wherein the nail means 106 holdingly engage the stem ends 126 of the tobacco leaves 52. The stick handler standing on the platform 30 then reaches over and lifts the closed stick means 54 from the tobacco supporting means 50, the bulk of the picked tobacco leaves 52 holdingly engaged by the stick means 54 providing upward pressure on the tobacco supporting means 50 thereby automatically relasing the tobacco leaves 52 therefrom by pivoting the guide roller means 80 and 80′ and the spring-pressed roller means 68 about their pivotal supports at 86 and 88, respectively, to the upwardly extending release position shown in dotted lines in FIGURES 6 to 8. Any conventional biasing means may be provided to return these elements to their holding position if found necessary. The stick handler then places the full stick means on the pallet 36 and positions an empty stick means with the stick members open with respect to each other on the tobacco supporting means 50 in preparation for the next load of tobacco leaves 52. The cropper may substantially continuously harvest the tobacco leaves, the tobacco supporting means 50 only being raised to the release position sufficiently to allow the tobacco leaves 52 on the previous stick means 54 to pass therethrough. It is not necessary for the cropper to wait for the stick handler to position an empty stick means 54 on the tobacco supporting means 50 since the holding means 66 will temporarily holdingly engage tobacco leaves 52 as he feeds them into the nip portion 69. The cropper need only move the carriage 62 rearwardly on the support element 56 so that he will again be placing tobacco leaves 52 in the forward portion of the holding means 66.

It will be seen that the tobacco harvesting machine of the instant invention permits continuous harvesting by the cropper since he never has to wait for a stringer to catch up with him and to be prepared to receive additional tobacco leaves. Furthermore, the cropper will function more efficiently with the instant harvesting machine in that he may always feed the picked tobacco leaves into the exact same position since the nip portion 69 of the holding means 66 remains stationary, thereby precluding the necessity of his determining the availability and position of the stringer before relieving himself of the tobacco leaves. Since no stringing function is necessary, the tobacco leaves receive relatively little handling, only the stem ends 126 being engaged during the harvesting procedure, the tip ends 76 only being supported by the trough means 70 as a precautionary measure with relatively little pressure being applied against the tobacco leaves. Since such a great quantity of tobacco leaves acts against the holding means 66 in moving the same to the release position, each individual leaf receives relatively little contact. The stick means 54 are relatively quickly and efficiently moved to the closed position by the pushing means 112 and the nail means 106 pierce certain of the stem ends 126 of the tobacco leaves 52, the remainder of the leaves being holdingly engaged by the stick means 54 by virtue of the crowded relationship between the nail means 106.

It will now be seen that there is herein provided an improved harvesting machine which requires a labor force of only five individuals as compared to the nine member harvesting team conventional heretofore and that the disclosed tobacco harvesting machine satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative and not in a limiting sense.

I claim:

1. A tobacco harvesting machine comprising a main frame, at least one tobacco harvesting unit carried by said main frame and including a unit frame means, propelling means operatively secured to said main frame for moving said tobacco harvesting unit along the row of tobacco plants including a plurality of tobacco leaves each having tip ends and stem ends, seat means secured to said unit frame means for carrying a cropper in juxtaposition to the row of tobacco plants whereby he may substantially continuously pick the plurality of tobacco leaves as said tobacco harvesting unit is moved along the row of tobacco plants, tobacco supporting means including a horizontal member and a trough secured to said unit frame means, said tobacco supporting means temporarily receiving and holdingly engaging picked tobacco leaves as they are fed by the cropper, stick means removably carried by said tobacco supporting means, said stick means being movable to holdingly engage the picked tobacco leaves when sufficient picked tobacco leaves are carried by said tobacco supporting means to warrant transfer from said tobacco harvesting unit, said stick means including two stick members movable with respect to each other between an open position wherein they are spaced from any portion of the picked tobacco leaves extending therebetween and a closed position wherein they holdingly engage any portion of the picked tobacco leaves extending therebetween, one of said stick members including portions defining a longitudinally extending notch means therein, the other of said stick members including a plurality of longitudinally spaced, transversely extending, nail means directed toward said notch means, each of said nail means having sharpened terminal portions spaced from said notch means when said stick is in said open position and engaged in said notch means when said stick means is in said closed position, each of said stick members further including cooperating telescoping means to guide the movement of said stick means between said open and said closed positions, and a plurality of longitudinally spaced string means are secured between said stick members to limit the space therebetween when said stick means is moved to said open position.

2. The structure of claim 1 wherein a plurality of tobacco harvesting units are carried by said main frame means, said tobacco harvesting units being laterally spaced with respect to the direction of movement by said propelling means to permit harvesting of an equal plurality of rows of tobacco plants.

3. The structure of claim 1 wherein said seat means and said tobacco supporting means are each carried by said unit fame means in vertically adjustable relationship.

4. A tobacco harvesting machine comprising a main frame means, at least one tobacco harvesting unit carried by said main frame means and including a unit frame means, propelling means operatively secured to said main frame means for moving said tobacco harvesting unit along the row of tobacco plants including a plurality of tobacco leaves each having tip ends and stem ends, seat means secured to said unit frame means for carrying a cropper in juxtaposition to the row of tobacco plants whereby he may substantially continuously pick the plurality of tobacco leaves as said tobacco harvesting unit is moved along the row of tobacco plants, tobacco supporting means including a horizontal member and a trough secured to said unit frame means, said tobacco supporting means temporarily receiving and holdingly engaging picked tobacco leaves as they are fed by the cropper, stick means removably carried by said tobacco supporting means, said stick means being movable to holdingly engage the picked tobacco leaves when sufficient picked tobacco leaves are carried by said tobacco supporting means to warrant transfer from said tobacco harvesting unit, said stick means including two stick members movable with respect to each other between an open position wherein they are spaced from any portion of the picked tobacco leaves extending therebetween and a closed position wherein they holdingly engage any portion of the picked tobacco leaves extending therebetween, said tobacco supporting means including a substantially horizontally extending support element secured to said unit frame means in fixed relation to said seat means, a tobacco supporting carriage slidingly carried by said support element and movable longitudinally with respect thereto, and cable holding means secured to said carriage for movement therewith, a spring pressed roller means secured to said support element and cooperating with portions of said holding means to define a nip portion maintained in a substantially stationary fixed relationship with respect to said seat means as said carriage is moved with respect to said support element, whereby the cropper may continuously feed picked tobacco leaves into said nip portion to be temporarily supported by said holding means.

5. The structure of claim 4 wherein the stem ends of the tobacco leaves are received by said holding means with portions of the same extending upwardly between said stick members when said stick means is in said open relationship and with the tip ends thereof depending below said holding means.

6. The structure of claim 5 wherein said tobacco supporting means further includes trough means carried by said unit frame means and supporting the depending tip ends of the picked tobacco leaves carried by said holding means.

7. The structure of claim 5 further comprising pushing means secured to said support element and including portions juxtaposed to one of said stick members, said pushing means being selectively actuated to engage said portions with said one stick member and to thereby push said one stick member toward the other of said stick members thereby moving said stick means from said open to said closed positions.

8. The structure of claim 7 wherein said pushing means further includes tab means engaging over said one stick member when said pushing means is selectively actuated, said tab means limiting upward movement of said one stick member and thereby precluding accidental buckling of said stick means during movement of the same from said open to said closed position.

9. The structure of claim 7 wherein stop means are secured to said tobacco supporting means in abutting relationship to the side of said other stick member remote from said one stick member, said stop means being spring-biased to permit accommodation of slight variation in dimensions of said stick means.

10. The structure of claim 5 wherein said tobacco supporting means releases the picked tobacco leaves temporarily supported by said holding means when said stick means, in said closed position, is lifted from said tobacco supporting means.

11. The structure of claim 10 wherein said holding means includes at least one longitudinally extending cable member disposed on each side of said carriage, guide roller means rotatably and pivotally secured to each side of said carriage, said guide roller means having portions defining groove means guiding and carrying said cable members, and intermediate guide roller means, said spring-pressed roller means and said intermediate guide rollers means being pivotally secured to said support element and normally biasing at least one cable member on one side of said carriage into juxtaposition with at least one cable member on the other side of said carriage to define said nip portion, said guide roller means, said intermediate guide roller means, and said spring-pressed roller means being movable from a substantially horizontally extending holding position to an upwardly extending release position by upward pressure of the picked tobacco leaves on lifting of said stick means in said closed position, said cable members being juxtaposed to temporarily support the picked tobacco leaves in said holding position and being spaced to free the picked tobacco leaves for transfer with said stick means from said tobacco harvesting unit in said release position.

12. The structure of claim 11 wherein spring means are provided normally biasing each of said cable members into taut engagement with said guide roller means and with said spring-pressed roller means.

References Cited by the Examiner

UNITED STATES PATENTS

| | | | |
|---|---|---|---|
| 1,573,020 | 2/26 | Scruggs | 56—27.5 |
| 2,738,213 | 3/56 | Parrish | 294—5.5 |
| 2,797,827 | 7/57 | Mish | 214—83.1 |
| 2,954,132 | 9/60 | Davis | 214—5.5 |
| 3,083,517 | 4/63 | Wilson | 214—5.5 X |
| 3,143,370 | 8/64 | Danford et al. | 294—5.5 |

FOREIGN PATENTS

| | | |
|---|---|---|
| 121,340 | 5/46 | Great Britain. |

HUGO O. SCHULZ, *Primary Examiner.*

MORRIS TEMIN, *Examiner.*